United States Patent Office 3,285,541
Patented Nov. 15, 1966

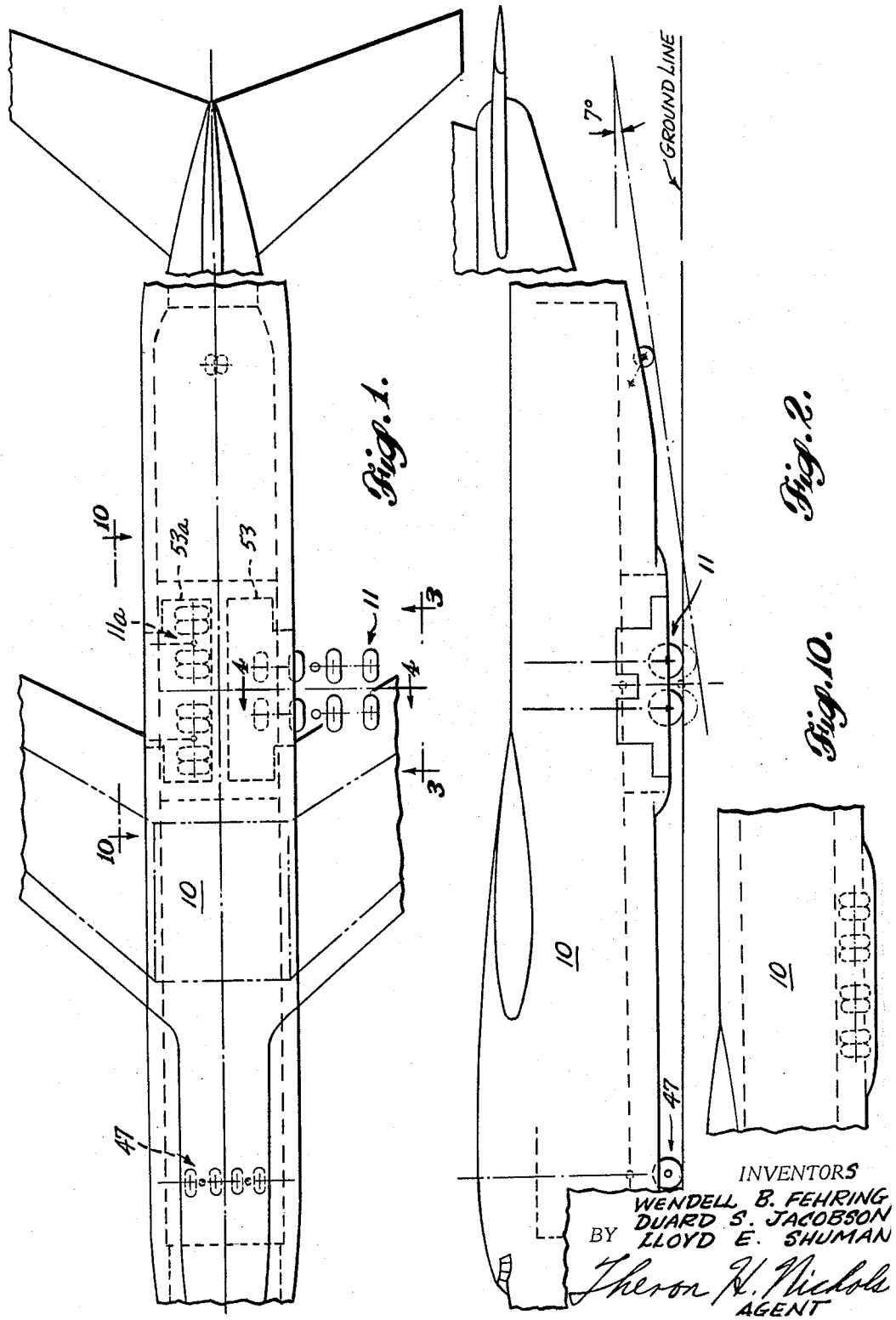

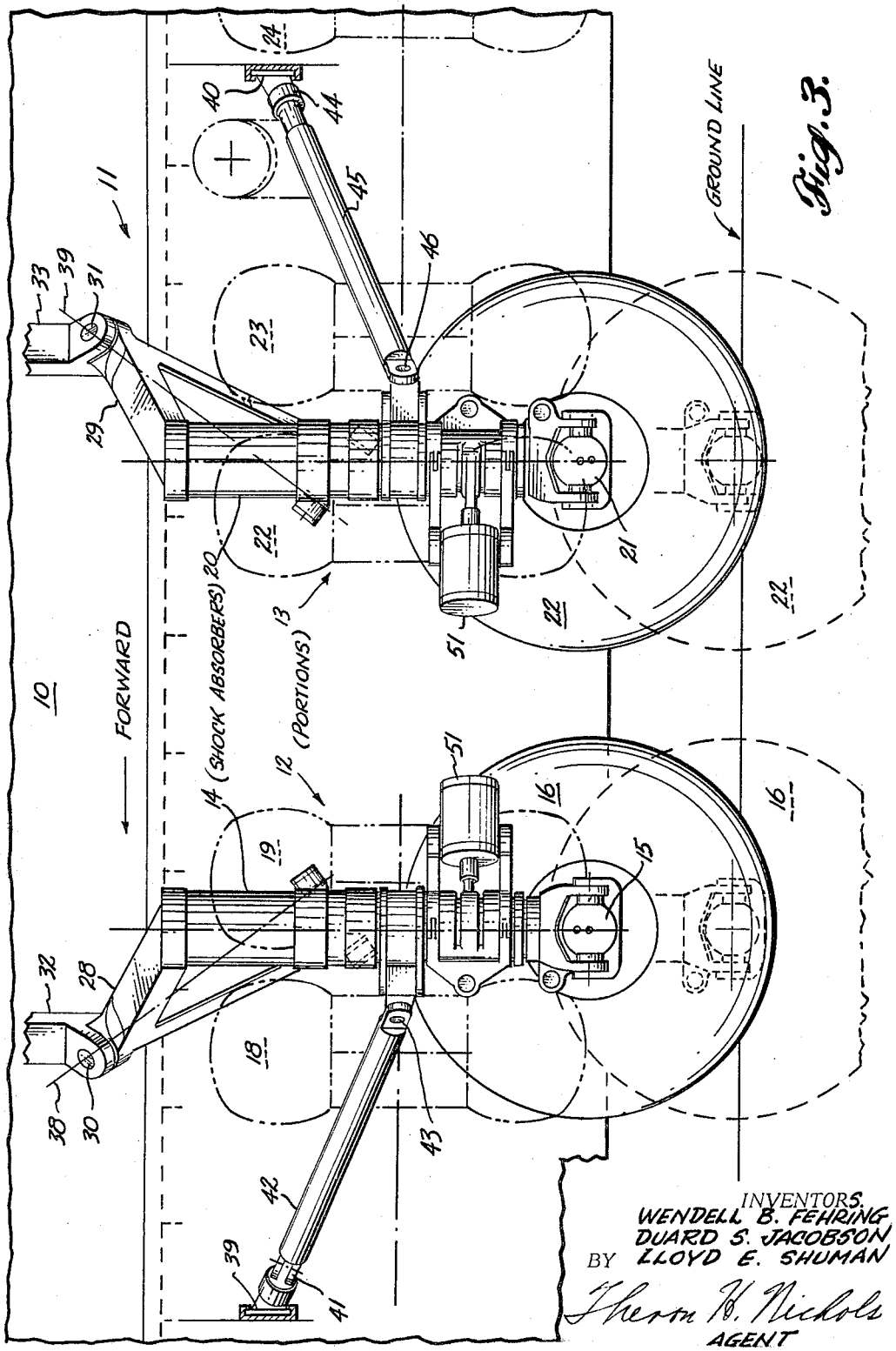

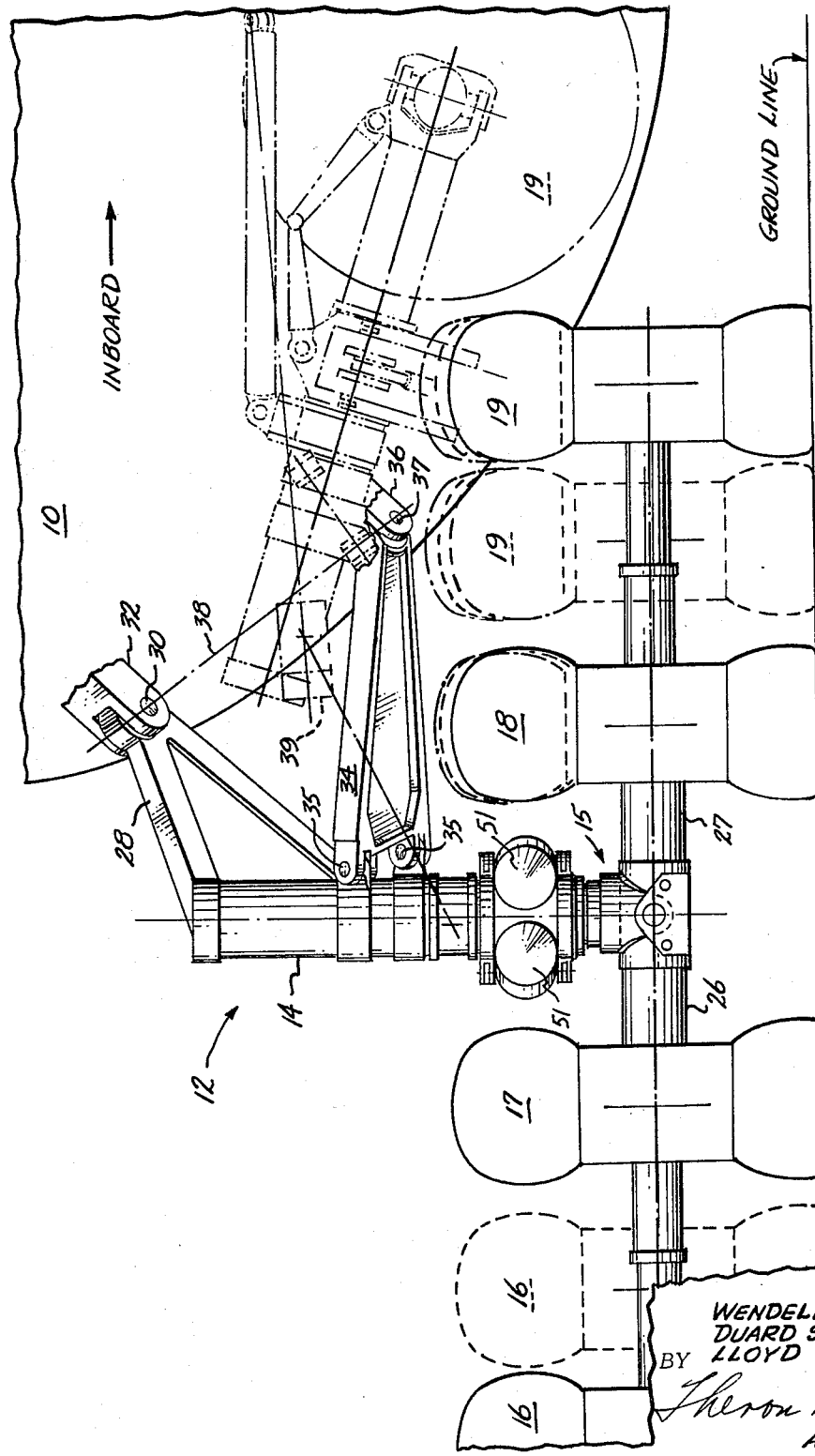

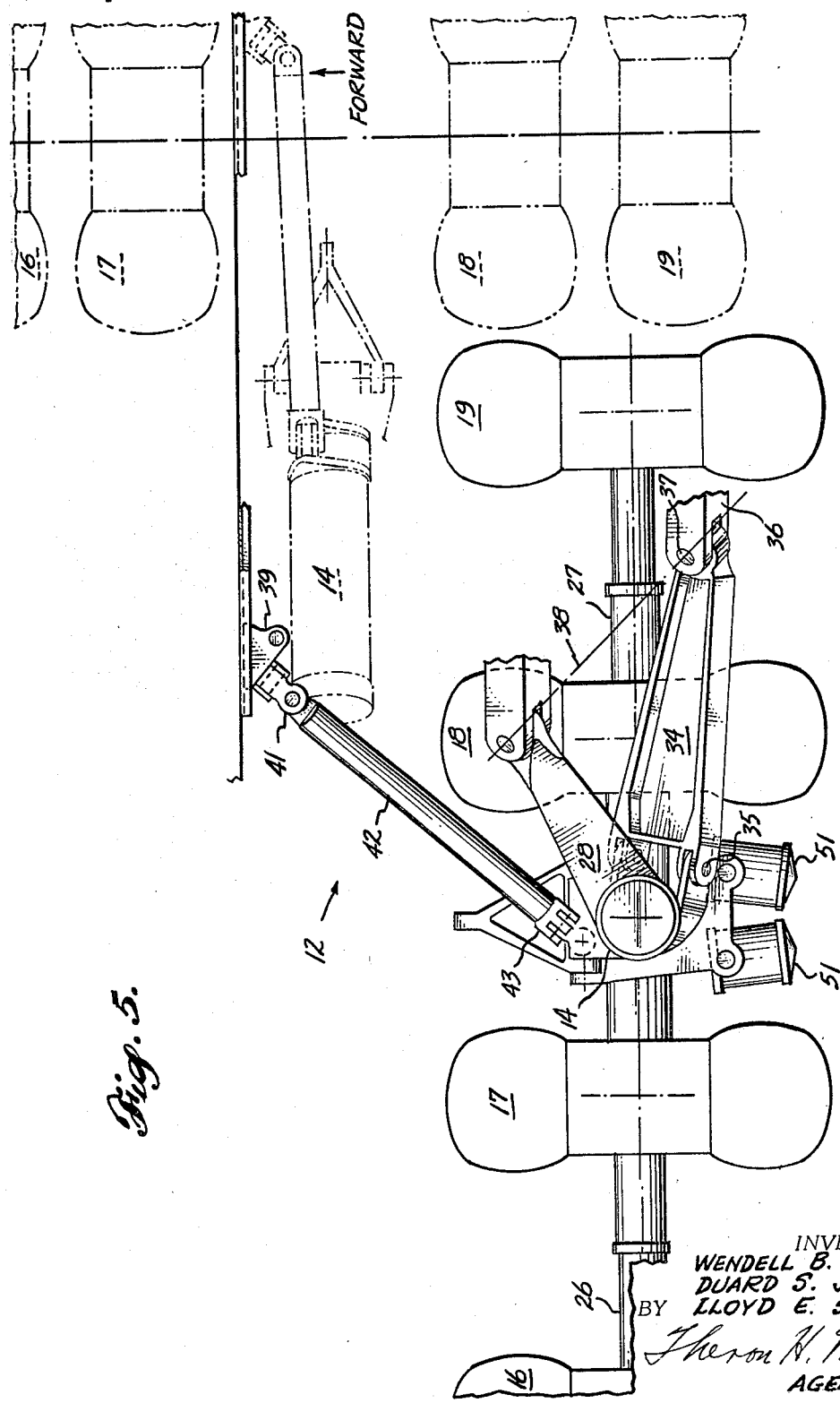

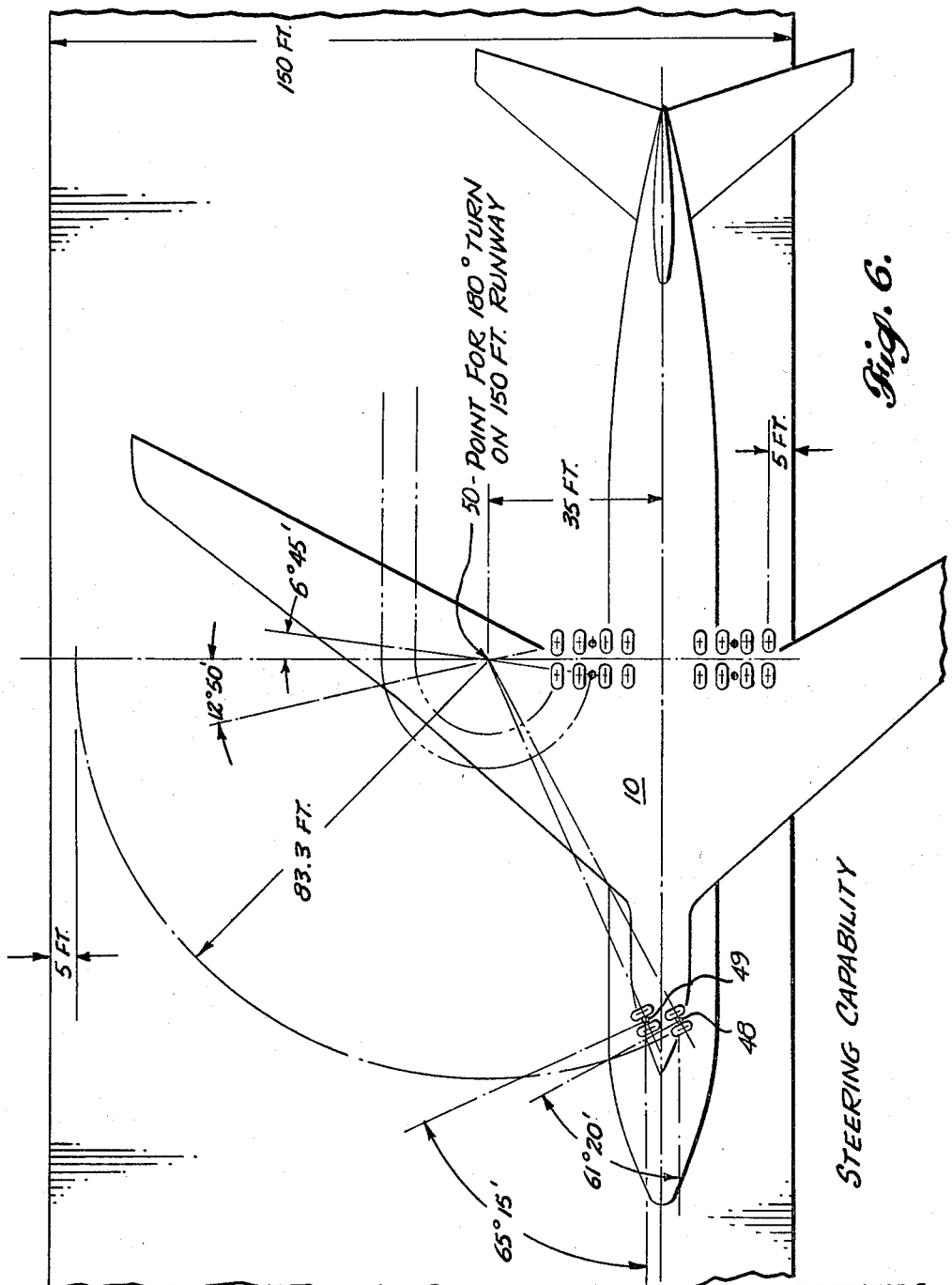

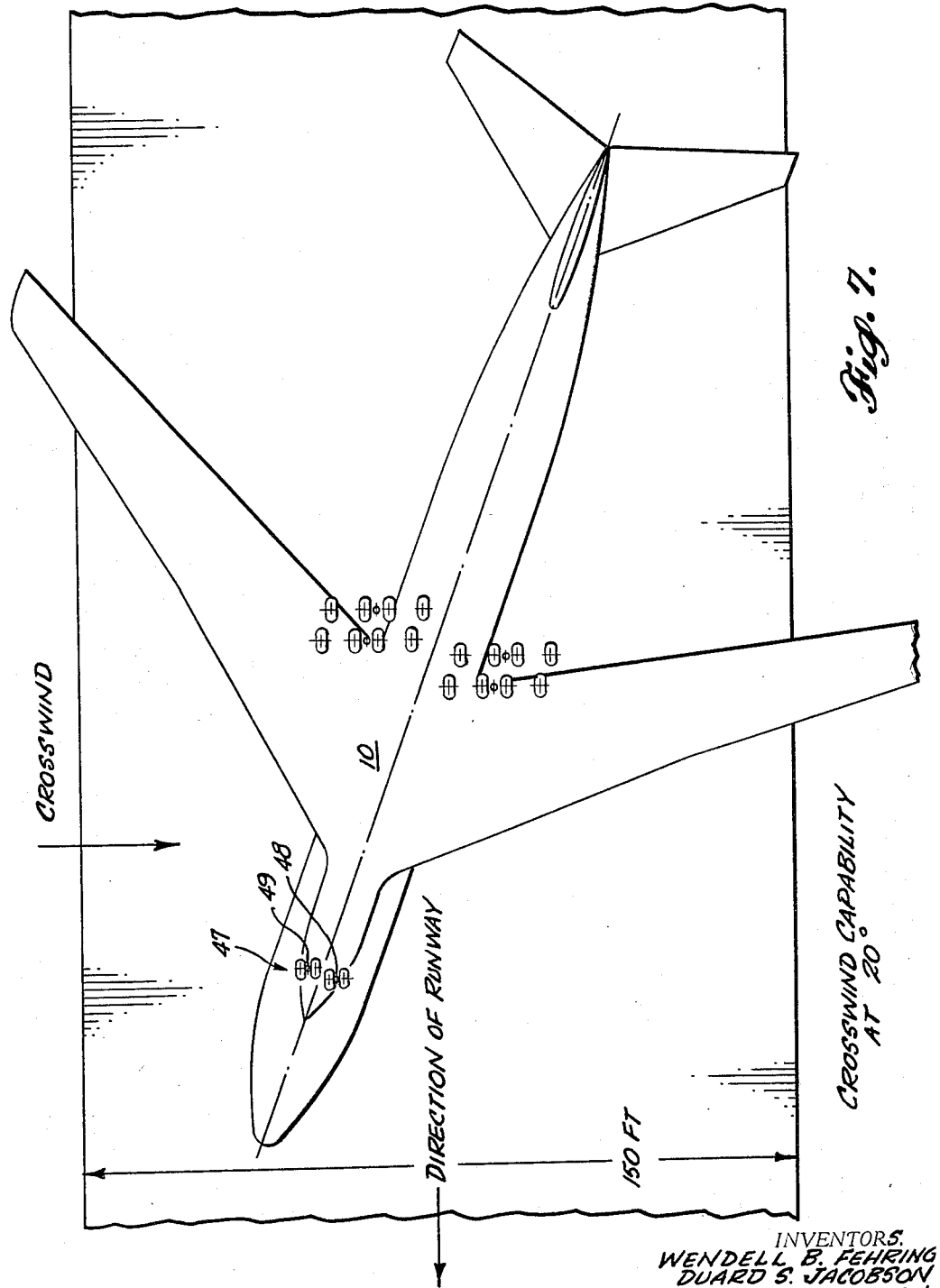

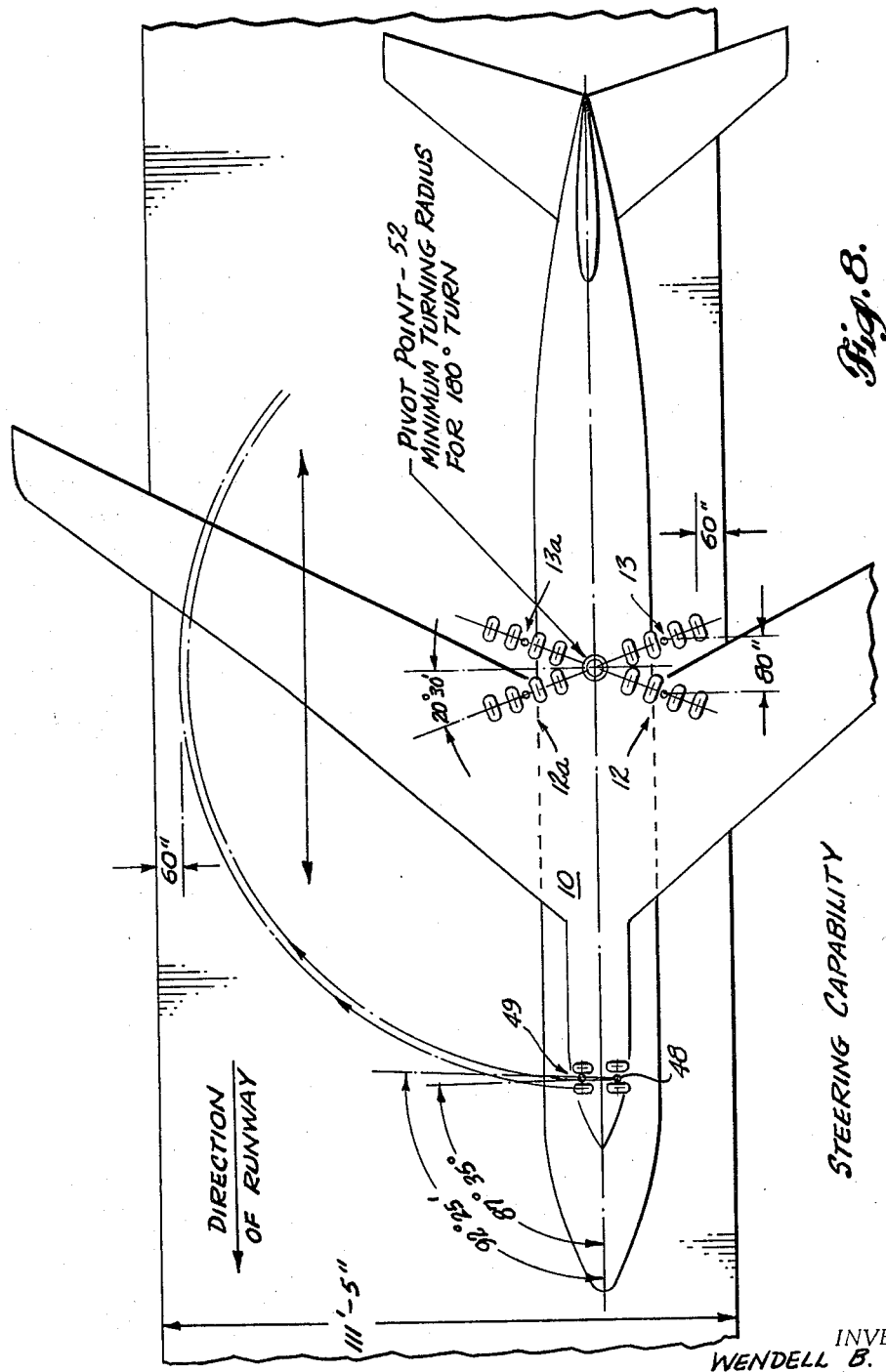

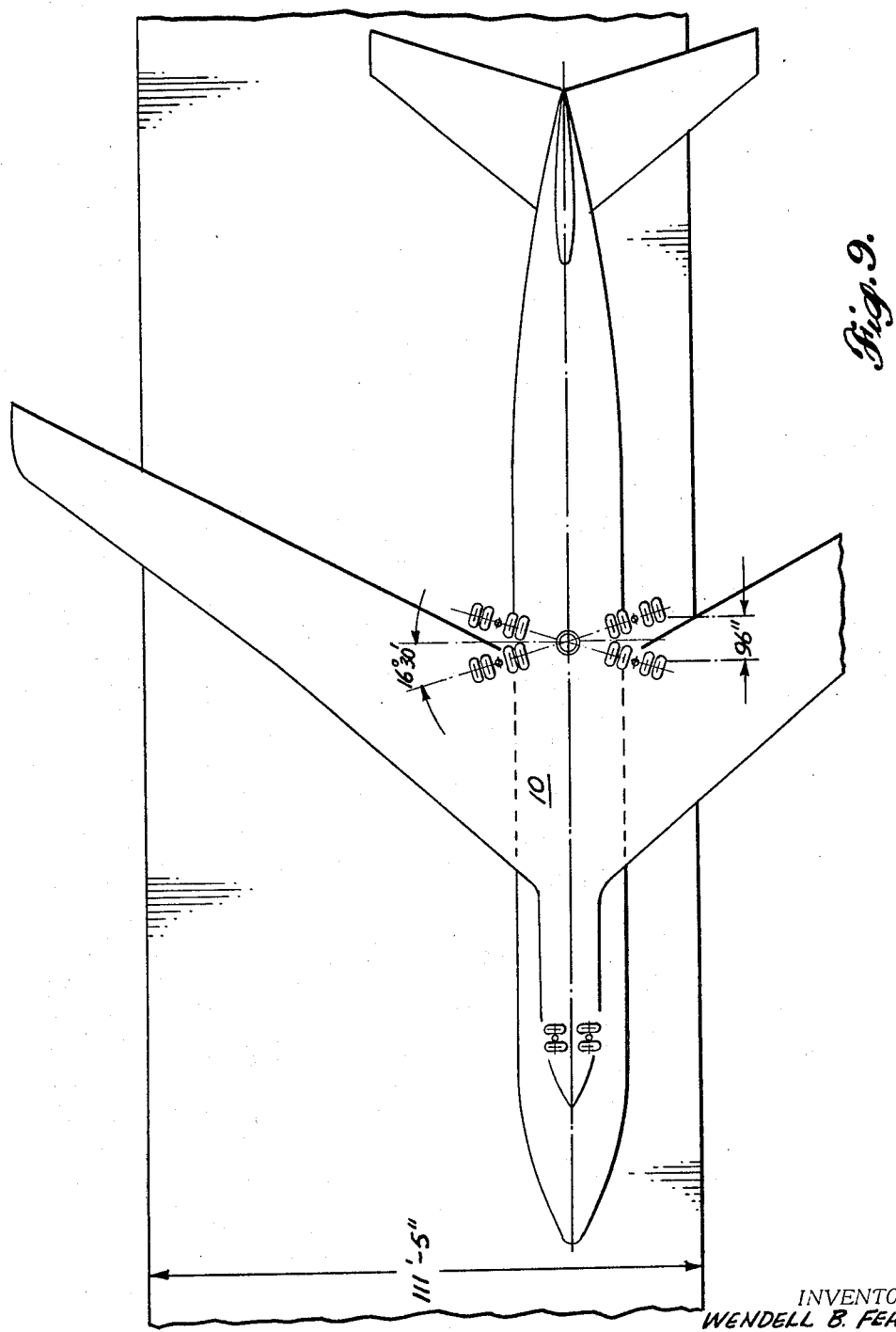

3,285,541
CANTED AXIS RETRACTABLE DOUBLE STRUT
LANDING GEAR
Wendell B. Fehring, Issaquah, and Duard S. Jacobson and
Lloyd E. Shuman, Seattle, Wash., assignors to The Boeing Company, Seattle, Wash., a corporation of Delaware
Filed Apr. 4, 1966, Ser. No. 539,971
30 Claims. (Cl. 244—50)

This invention, a continuation-in-part of assignee's copending patent application by W. B. Fehring, F. W. Scherer, L. E. Shuman, and T. R. Volberding, Serial No. 391,166, filed August 21, 1964, now U.S. Patent 3,244,385, pertains to a retractable landing gear for very large aircraft and/or for supporting aircraft on very soft fields.

More particularly the disclosed invention comprises a retractable double strut landing gear on each side of the aircraft wherein on each side each of the struts is retractable in opposite directions, one foreword and one aft, and each strut carries one or more pairs of wheels on extendible axles if so desired, as disclosed in assignee's above identified patent application.

In large aircraft the storage of the supporting landing gear is a great problem, particularly when space becomes so valuable and weight is so critical. Every pound saved in aircraft structure and every cubic foot of space made available means a gain in hundreds of dollars in revenue from the aircraft.

When landing gears are mounted on the wings to provide a wide track, the mounting structure required includes long and heavy shock struts, long and heavy drag struts, and large internal wing spars. More efficient landing gears for today's large aircraft are required.

Accordingly a principal object of this invention is to provide an aircraft retractable multiple wheel landing gear that is mounted directly to the fuselage main structure and which will extend from a compact wheel well in the fuselage to a position wherein the shock strut is in a longitudinal vertical plane completely outboard of the fuselage.

Another principal object of this invention is to provide a multiple wheel landing gear that has the advantages of a truck of parallel axles when in the extended position, and yet have the additional advantages of, in effect, the feature of splitting apart during retraction into smaller and lighter portions, providing more compact stowage, and retaining the center-of-gravity at the same precise location, whether the landing gear be retracted or extended.

A further object of this invention is to provide a compact multiple wheel landing gear that requires a smaller wheel well, one that requires less wheel well width storage space, and one having on aerodynamic drag producing frontal area reduced to one half the frontal area of conventional landing gear bumps, pods, or blisters.

A still further object of this invention is to provide a multiple wheel landing gear having fore and aft parallel wheel axles wherein the front and rear wheels may be positioned closer together than ever before possible with the conventional double axle truck of wheels so that a horizonal tail of reduced size will still rotate the large aircraft about its lateral axis during takeoff, since both fore and aft wheels are closer to the median of the whole landing gear.

Yet a still further object of this invention is to provide a multiple wheel landing gear with the fore and aft wheels closer together than the conventional wheel truck gear to provide improved steering characteristics by requiring less steering forces, particularly for crosswind landings and turn around, and accordingly less tire scrubbing and sliding.

Another object of this invention is to provide, on an aircraft having fore and aft wheels, the feature during nose high landings of utilizing the forward wheels and shock absorber more effectively and efficiently.

A further object of this invention is to provide, on an aircraft having fore and aft wheels, the feature of no brake equalizer being required on the landing gear as is required on conventional wheel trucks to prevent pitching of the trucks and/or even tumbling thereof during emergency braking, particularly short wheel base trucks.

A still further object of this invention is to provide a multiple wheel and axle aircraft landing gear in which the axles are easily rotatable while in the extended condition from a position where the axles are parallel to each other to a position where the axles are at an angle to each other for turning the aircraft around on the ground about a vertical line through the center of the aircraft.

Yet a still further object of this invention is to provide an aircraft multiple wheel landing gear having means for separating one wheel axially from its adjacent wheel on the same axle by a distance of at least twice the width of the tire contact area and accordingly increasing the flotation capabilities of the landing gear.

Other objects and various advantages of the disclosed landing gear will be apparent from the following detailed description, together with the accompanying drawings, submitted for purposes of illustration only and not intended to define the scope of the invention, reference being made for that purpose to the subjoined claims.

Briefly this invention comprises retractable enantiomorphic landing gears on both sides of the aircraft, the landing gear on one side comprising two allochiral portions, each portion comprising an axle for mounting a plurality of wheels fixed to the lower end of a vertical shock absorber, the latter having a canted pivotal joint connection with the fuselage. The front portion pivots forwardly and inwardly to its retracted position and the aft portion pivots rearwardly and inwardly to its retracted position where the portions are coaxial with each other and requiring only a narrow wheel well having a decreased frontal area in the fuselage bottom and when extended the two parallel axles of wheels may be closer together for improved steering, less scrubbing of tires, smaller horizontal tail required, and more utilization of the front wheels and shock absorber in nose high landings without the possibility of pitching or tumbling of the wheels as when on wheel trucks.

The drawings diagrammatically illustrate by way of example, not by way of limitation, one form of the invention wherein like reference numerals designate corresponding parts in the several views in which:

FIG. 1 is a plan view of the portion of the aircraft with the novel landing gear thereon, the right main landing gear wheels being illustrated in retracted position, and for illustrative purposes only, the left main landing gear wheels being shown in down position;

FIG. 2 is a side view of the aircraft of FIG. 1;

FIG. 3 is an enlarged side view taken at 3—3 on FIG. 1, with the wheels illustrated in solid lines in down position, illustrated in dot-dash lines in the retracted position, and illustrated in broken lines in aircraft jacked up position;

FIG. 4 is an enlarged view taken at 4—4 on FIG. 1, of the front portion of the landing gear with the wheels illustrated in sold lines in the wheels down and axle extended position, the latter position the end wheels being illustrated in broken lines in the axial contracted position preparatory to landing gear retraction, and the landing gear being illustrated in dot-dash lines in the retracted position;

FIG. 5 is a top view of FIG. 4;

FIG. 6 is a plan view similar to FIG. 1 of an aircraft with parts of the fuselage cut away in the immediate vicinity of the new landing gear only showing the steering capability of this modification;

FIG. 7 is a plan view similar to FIG. 1 of an aircraft with the new landing gear showing its crosswind capabilities;

FIG. 8 is a plan view of an aircraft with parts of the fuselage cut away in the immediate vicinity of a modification of the new landing gear illustrating the steering capabilities with the wheel axles extended;

FIG. 9 is a view similar to FIG. 8, but with the extendible axles in contracted position; and FIG. 10 is a side view taken at 10—10 on FIG. 1.

The invention, the scope of which being defined in the appended claims, is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

Top and side views, FIGS. 1 and 2, respectively, illustrate the geeral arrangemet of the wheels. Both FIGS. 1 and 2 show how the left landing gear 11 appears when in extended position projecting from fuselage 10 of a large aricraft and both FIGURES show schematically how the wheels are mounted on two tandem parallel transverse axles and shown fixed to the respective axles are fore and aft shock struts described in greater detail hereinafter.

For illustrative purposes only, FIG. 1 also shows in broken lines the right landing gear in retracted position wherein the two axles are now coaxial with each other in one narrow wheel well. FIG. 10 shows the same in solid lines.

The main landing gear 11a on the right side of the fuselage 10 being the enantiomorphic analogue of the main landing gear on the left side, accordingly, only the left landing gear need be disclosed in detail.

FIGS. 2, 4, and 5, side, rear, and top views, respectively, of the left main landing gear 11 with parts cut away disclose more details thereof.

A main feature of the disclosed invention is that each of the main left and right landing gears 11 and 11a, respectively comprise two portions, the left landing gear comprising for example, the two portions 12 and 13. These portions are not identical portions for then they would not operate or function as intended whatsoever, but which are instead, allochiral portions for forming a fair superior and efficient landing gear which produces results long desired, but never attained before as brought out hereinafter, one feature being the maintaining of a constant C.G. (center of gravity) throughout retraction and extension of the landing gear.

FIG. 3 illustrates the left main landing gear 11 with the fore portion 12 comprising shock strut or absorber 14 supported by axle 15 carrying the four wheels 16, 17, 18, and 19, wheel 17 being shown on FIG. 4. The relative position of all wheels is shown more clearly on FIG. 4. The aft portion 13, FIG 3, of the left main landing gear 11 is the allochiral analogue of portion 12 and comprises shock absorber 20 supported by axle 21 carrying the four wheels 22, 23, 24, and 25, the latter wheel shown on FIG. 1. The individual wheels may be raised for tire changes, for pulling out of the mud, etc., with means as disclosed in assignee's copending application identified previously in the first paragraph.

FIG. 4 illustrates the outer portion 26 of axle 15 carrying the outer pair of wheels 16 and 17, and the inner portion 27 of axle 15 carrying the inner pair of wheels 18 and 19. While not required, both portions of the preferred landing gear axles are extendible as disclosed in assignee's copending application identified previously in the first paragraph wherein the wheel 16 on the outer portion 26 and the wheel 19 on the inner portion 27 may be moved away from their respective adjacent wheels 17 and 18 by a distance of approximately four radii of the tire contact area for increasing the supporting capability of heavy aircraft on soft fields.

While the forward and aft wheels, FIG. 3 are illustrated as being well spaced apart in the fore and aft direction for clarity of disclosure, another feature of this invention is that they may be positioned as close together as possible without touching for improved rotation of the aircraft during take-off, improved steering characteristics, more efficient use of the shock absorbers, etc., without the possibility of pitching or tumbling of the wheels. Pitching or tumbling of wheel trucks occurs with trucks having closely mounted wheels, no break equalizers, and hard application of the brakes.

Shock absorbers 14 and 20, FIG. 3 have fixed mounting brackets 28 and 29, respectively pivotally connected with pins 30 and 31 to the aircraft main structure 32 and 33. As shown in the fore portion 12 of the landing gear, the allochiral analogue of the aft portion 13, a link 34, FIG. 4, is pivotally connected between strut 14 with pins 35 and main structure 36 with pin 37. Coaxial pins 30 and 37 are on canted pivotal axis 38, FIG. 4, of the fore landing gear portion and pin 31, FIG. 3, and its coaxial pin (not shown) are on canted pivotal axis 39 of the aft landing gear portion. While the preferred main structural elements 32, 33, and 36, FIG. 4 are illustrated as parts of the fuselage, in fullfilling requirements for other types of aircraft and with extensive redesign, they may be parts of the wing structure.

FIG. 3 illustrates further the fore and aft retracting and extending actuators 39 and 40 for the two allochiral landing gear portions 12 and 13. Actuator 39 is positioned forwardly and inboard of shock strut 14 while actuator 40 is positioned rearwardly and inboard of shock strut 20. These actuators, as actuator 39, for example, may comprise any suitable motor means, such as but not limited to an approximately horizontal jack screw, shown in broken lines on FIG. 4 and schematically on FIG. 5. A universal joint 41, FIG. 3 connects the actuator 39 to the inner end of a link 42, and a universal joint 43 connects the outer end of link 42 to the shock strut 14. Likewise on FIG. 3 is shown universal joint 44 connecting the aft actuator 40 to a link 45 which in turn is connected with universal joint 46 to aft shock strut 20.

In operation of the main landing gears, both left and right allochiral landing gears, 11 and 11a, are retracted or extended simultaneously. Likewise, in the operation of the left landing gear, for example, the allochiral fore and aft portions 12 and 13 are retracted or extended simultaneously with suitable conventional controls and switches.

For retraction of the left landing gear portion, for example, actuator 39, FIGS. 3, 4, and 5 pull link 42, FIGS. 3 and 5, inboard, pivoting the shock strut 14 forwardly and inwardly about its canted pivotal axis 38 to the broken line position illustrated in FIG. 4. As seen in FIGS. 3–5, the axle 15 rotates from the extended transverse position spaced from and normal to the aircraft longitudinal axis to the retracted longitudinal position closely adjacent to and parallel to the aircraft longitudinal axis. Another feature of this landing gear is the contractability of the axle outer and inner portions, 26 and 27 of axle 15, FIG. 4, for moving the outer wheels 16 and 19 from the maximum supporting position spaced four radii of the tire contact area from inner wheels 17 and 18, respectively, to a wheels contiguous position for retraction. The axle portions 26 and 27 are thus telescoped prior to complete retraction of the wheels into the fuselage. Retracting actuator 40, FIG. 3, retracts the aft landing gear portion 13 simultaneously with retraction of the forward portion 12, the aft shock strut and wheels pivoting rearwardly and inwardly, instead, about canted axis 39 to their retracted position where all wheels of the left allochiral landing gear portions are aligned on one axis in a small compact wheel well 53, FIG. 1.

Thus during retraction the wheels of the left landing gear, for example, are moved from the large foot print, maximum supporting and extending position illustrated in FIGS. 1, 3–7, and 9 to their compact, contiguously spaced apart, retracted position in an elongated narrow wheel well illustrated in FIG. 1.

The preferred nose wheel supporting means 47, FIG. 1, comprises two transversely mounted shock struts 48 and 49, FIG. 6, under the nose of the aircraft fuselage 10. Each nose shock strut 48 and 49 has mounted on the lower end thereof a conventional axle and a pair of wheels. Each axle is individually steerable through at least 90° by suitable conventional control means and accordingly are rotatable through the various angles illustrated in FIGS. 6–9.

FIG. 6 discloses the steering capabilities of the new landing gear wherein with the main wheels maintained spread apart and each of the nose wheel struts 48 and 49 rotated until their respective wheel axles are aligned with a common turning radius pivot point 50 outboard of the main landing gear on a transverse line midway between the main fore and aft axles, the aircraft, while taxiing may execute a 180° turn on the average runway.

FIG. 7 discloses how all individual wheel struts may be rotated for crosswind landings. Strut rotating means 51, FIGS. 3–5 and a suitable control means (not shown) for rotating each strut to the desired angle may be incorporated with the shimmy damper on each strut for crosswind landings, this angle being substantially the same for all struts.

FIG. 8 discloses the new landing gear with a modified steering capability while the wheel axles are extended. Here the left fore landing gear portion 12 is rotated clockwise to the desired angle, such as but not limited to 20°30′, and the diagonally opposite or right aft landing gear portion 13a is rotated clockwise by the same amount whereby the two axles are coaxial. Likewise, the left aft landing gear portion 13 and the right fore landing gear portion 12a are rotated through the same angle counter-clockwise until their two axles are coaxial. The intersection of these four axles is pivot point 52 for the whole airplane. Thus, with the axles of the two nose wheel struts 48 and 49 aligned with pivot point 52, the turning radius for the aircraft is the minimum length, zero.

FIG. 9 discloses the modification of FIG. 8 with the difference that where the ground supporting surface is strong enough to prevent collapse or rutting thereof, the extendible axles may be contracted, as illustrated.

Accordingly a canted axis retractable double strut landing gear has been disclosed, and the landing gear on the left side comprising two allochiral portions and the landing gear on the right side comprising two allochiral portions for forming a multiwheel landing gear having the advantages of a truck of wheels when extended, yet not the disadvantages, such as pitching and tumbling of the wheel trucks. When retracted all landing gear wheels on one side are coaxial in an elongated narrow wheel well, as well as all wheels on the other side are coaxial in another elongated narrow wheel well.

Likewise, all objects of the invention are shown to be fully met by the disclosed landing gear.

It will be understood that this invention can be modified to adapt it to various circumstances and conditions, and it is accordingly desired to comprehend within the purview of this invention such modifications as may be considered to fall within the scope of the appended claims.

We claim:
1. An aircraft having two sides,
 (a) retractable allochiral landing gears on both sides of the aircraft, the landing gear on one side comprising,
 (b) first axle means for carrying a plurality of landing wheels,
 (c) second axle means for carrying a plurality of landing wheels,
 (d) first actuator means for retracting said first axle means to a position parallel to the aircraft longitudinal axis, and
 (e) second actuator means for retracting said second axle means to a position collinear with said retracted second axle means for requiring less wheel well width storage space.

2. An aircraft having two sides,
 (a) retractable allochiral landing gears on both sides of the aircraft, the retractable landing gear on one side comprising,
 (b) first and second pivotal strut means for said one side of the aircraft,
 (c) first axle means normal to the aircraft longitudinal axis for said first strut means for carrying a plurality of landing wheels for supporting the aircraft on the ground,
 (d) second axle means normal to the aircraft longitudinal axis for said second strut means for carrying a plurality of landing wheels for supporting the aircraft on the ground,
 (e) first actuator means for retracting said first axle means to a position in the aircraft parallel to the aircraft longitudinal axis, and
 (f) second actuator means for retracting said second axle means to a position in the aircraft parallel to the aircraft longitudinal axis for requiring less wheel well width storage space.

3. A retractable landing gear as recited in claim 2 wherein,
 (a) said second actuator means also comprises means retracting said second axle means to a position behind said retracted first axle means.

4. A retractable landing gear as recited in claim 2 wherein,
 (a) said first actuator means comprising means for retracting said first axle means forwardly to its retracted position, and
 (b) said second actuator means comprising means for retracting said second axle means rearwardly to its retracted position.

5. A retractable landing gear as recited in claim 2 wherein,
 (a) said second axle means is aft of said first axle means while supporting the aircraft on the ground.

6. A retractable landing gear as recited in claim 2 wherein,
 (a) said second actuator means comprises means for retracting said second axle means to a position aft of said first axle means.

7. A retractable landing gear as recited in claim 2 wherein,
 (a) said second actuator means comprises means for retracting said second axle means to a position collinear with said retracted second axle means for requiring less wheel well width storage space.

8. A retractable landing gear as recited in claim 2 wherein,
 (a) said second strut is positioned aft of said first strut means.

9. A retractable landing gear as recited in claim 2 wherein,
 (a) said second strut means is positioned aft of said first strut means and on a line therewith parallel to the aircraft longitudinal axis when the wheels are extended.

10. A retractable landing gear as recited in claim 2 wherein, (a) said second axle means is responsive to said second pivotal strut means and said second actuator means for being positions in juxtaposition with said first anxle means when in extended position for providing the functions of a double axle truck of wheels while the aircraft is on the ground.

11. A retractable landing gear as recited in claim 10 wherein,
(a) said second axle means is responsive to said second pivotal strut means and said second actuator means for being retracted to a position collinear with said retracted first axle means for requiring less wheel well width storage space than for a double axle truck of wheels.

12. A retractable landing gear as recited in claim 2 wherein,
(a) said first pivotal strut means is responsive to said first actuator means for pivoting said first axle means from its extended position forwardly and inwardly to its retracted position, and
(b) said second pivotal strut means is responsive to said second actuator means for pivoting said second axle means from its extended position rearwardly and inwardly to its retracted position.

13. A retractable landing gear as recited in claim 2 wherein,
(a) said first actuator means is responsive to said first pivotal strut means for pivoting said first axle means outwardly and rearwardly from its retracted position to its extended position, and
(b) said second actuator means is responsive to said second pivotal strut means for pivoting said second axle means outwardly and forwardly from its retracted position to its extended position in juxtaposition with said extended first axle means for providing the functions of a double axle truck of wheels while the aircraft is on the ground.

14. A retractable landing gear as recited in claim 2 wherein,
(a) one of said strut means includes means for shortening its length while the landing gear is in extended position on the ground for jacking up off the ground the axle means and wheels thereon said one strut means.

15. A retractable landing gear as recited in claim 2 wherein,
(a) one of said strut means includes means for increasing its length while the landing gear is in extended position on the ground for jacking up off the ground the axle means and wheels on the other strut means.

16. An aircraft as recited in claim 2 wherein,
(a) said first pivotal strut means comprises,
(b) a fore shock strut,
(c) a canted pivotal joint connection between the top of said shock strut and said first side of the aircraft,
(d) said second pivotal strut means compromises,
(e) an aft shock strut positioned rearwardly of said fore shock strut, and
(f) a canted pivotal joint connection between the top of said aft shock strut and said first side of the aircraft.

17. An aircraft as recited in claim 16 wherein,
(a) said first actuator means comprises,
(b) a forward actuator,
(c) a movable connection between one end of said actuator and the lower end of said fore shock strut,
(d) a movable connection between the upper end of said actuator and said first side of the aircraft, and
(e) said second actuartor means comprises,
(f) an aft actuator,
(g) a movable connection between one end of said aft actuator and the lower end of said aft shock strut, and
(h) a movable connection between the other end of said aft actuator and said first side of the aircraft.

18. A retractable landing gear as recited in claim 2 wherein,
(a) each of said axle means includes operable means for separating all wheels thereon in an axial direction by a distance of at least one wheel width in the landing gear extended position for supporting greater weights on soft fields, and
(b) said operable means comprises means for moving the wheels on each of said axle means in an axial direction to a position contiguous with each other prior to retraction for requiring a shorter wheel well storage space.

19. A retractable landing gear as recited in claim 2 wherein,
(a) at least one of said axle means includes operable means for separating the wheels thereon in an axial direction by a distance of at least one wheel width in the landing gear extended position for supporting greater weights on soft fields, and
(b) said operable means comprises means for moving the wheels on said one axle means in an axial direction to a position contiguous with each other prior to retraction for requiring a shorter wheel well storage space.

20. An aircraft as recited in claim 19 wherein,
(a) said one axle means comprises an axle having at least two telescopic parts attached to the lower end of its strut means and carrying a wheel on each part,
(b) motor means for expanding said telescopic axle for separating said wheels for landings, and
(c) said motor means comprising means for contracting said telescopic axle for moving said wheels contigous with each other prior to retraction.

21. A retractable landing gear as recited in claim 2 wherein,
(a) both of said first and second axle means are pivotally mounted to the aircraft for rotational movement in a horizontal plane about a vertical for crosswind landings.

22. A retractable landing gear as recited in claim 2 wherein,
(a) both of said first and second axle means are pivotally mounted to the aircraft for rotational movement in a horizontal plane about a vertical axis for turning the aircraft around in a minimum space on the ground.

23. A retractable landing gear as recited in claim 22 wherein,
(a) said first axle means has means for being rotated about a vertical axis for rotating the outer wheel of its plurality of landing wheels to a position forwardly of the inner wheel of its plurality of landing wheels, and
(b) said second axle means has means for being rotated about a vertical axis for rotating the outer wheel of its plurality of landing wheels to a position aft of the inner wheel of its plurality of landing wheels whereby the aircraft may be rotated while on the ground about a vertical axis between the two allochiral landing gears.

24. Allochiral landing gears for both side of an aircraft, the landing gear on one side comprising,
(a) two downwardly extending fore and aft shock struts,
(b) pivotal mountings for pivotally mounting both of said fore and aft shock struts to one side of the aircraft on a line parallel to the aircraft longitudinal axis,
(c) an axle on the lower end of each of said fore and aft shock struts for carrying a plurality of landing wheels for supporting each shock strut when the aircraft is rolling on the ground, (d) said fore shock strut pivotal mounting having means for rotating its axle during retraction to a position parallel to the aircraft longitudinal axis, and (e) said aft shock strut pivotal mounting having means for rotating its axle during extension to a position collinear with said retracted fore strut axle for requiring less wheel well width storage space.

25. A retractable landing gear as recited in claim 24 wherein, (a) said fore shock strut pivotal mounting has means for rotating its axle during extension to a position normal to the aircraft longitudinal axis, and (b) said aft shock strut pivotal mounting has means for rotating its axle during extension to a position parallel to said axle of said fore shock strut when extended.

26. An aircraft as recited in claim 25 wherein, (a) a nose wheel is mounted on an axle, said axle being pivotally mounted on the aircraft forwardly of said retractable allochiral landing gears for rotational movement in a horizontal plane, and (b) said nose wheel being pivotable to a position where the longitudinal axis of said nose wheel axle intersects a line between and in the plane of said parallel axles of said fore and aft shock struts at a point outboard of said landing wheels for turning the aircraft around in a minimum space on the ground.

27. An aircraft having two sides, (a) allochiral landing gears for both sides of the aircraft, the landing gear on one side comprising, (b) downwardly extending for and aft shock struts, (c) means for pivotally mounting said shock struts to said one side of the aircraft on a line parallel to the aircraft longitudinal axis, (d) axle means for mounting a plurality of landing wheels on the lower end of each of said shock struts, (e) first actuator means for retracting said fore shock strut axle means to a position parallel to the aircraft longitudinal axis, and (f) second actuator means for retracting said aft shock strut axle means to a position collinear with said retracted fore shock strut axle means for requiring less wheel well width storage space.

28. A method for taxiing an aircraft having two fore and aft rotatable axles on each side, each axle carrying at least one wheel comprising the steps of, (a) aligning all axles normal to the aircraft longitudinal axis for straight taxiing of the aircraft over the ground, (b) rotating a first pair of axles comprising the fore axle on one side and the aft axle on the other side clockwise until the two axles of the first pair are coaxial, and (c) rotating a second pair of axles comprising the aft axle on the one side and the fore axle on the other side counterclockwise until the axles of the second pair are coaxial for turning the aircraft around about the pivot point formed by the intersection of the first pair of axles with the second pair of axles.

29. Enantiomorphic retractable landing gears for both sides of an aircraft, the landing gear on one side consisting of, (a) two independent portions, each of said portions including means for retractably mounting that portion of the aircraft, at least one of said portions having axle means retractable therewith, (b) each of said portions being the allochiral analogue of the other portion whereby the longitudinal position of the center of gravity of the landing gear on said one side of the aircraft remains constant during both retraction and extension thereof, and said axle means being retractable to a point substantially parallel to the longitudinal axis of said aircraft.

30. A landing gear as recited in claim 29 wherein, (a) said two portions are not identical portions.

References Cited by the Examiner
UNITED STATES PATENTS 2,538,389 1/1951 Smith _____ 244—50 X
3,216,673 11/1965 Alter et al _____ 244—36 X

FOREIGN PATENTS 1,315,158 12/1962 France.

References Cited by the Applicant
UNITED STATES PATENTS 2,403,835 7/1946 Villepigue.
2,659,555 11/1953 Schlender.
2,896,884 7/1959 Perdue.
3,038,687 6/1962 Hartel.
3,041,020 6/1962 Willitt.
3,121,547 2/1964 Paxhia et al.

FERGUS S. MIDDLETON, *Primary Examiner.*

B. BELKIN, *Assistant Examiner.*

UNITED STATES PATENT OFFICE
CERTIFICATE OF CORRECTION

Patent No. 3,285,541                          November 15, 1966

Wendell B. Fehring et al.

It is certified that error appears in the above identified patent and that said Letters Patent are hereby corrected as shown below:

Column 3, line 51, "fair" should read -- far --. Column 6, line 37, "means retracting" should read -- means for retracting --; line 61, "second" should read -- first --. Column 7, line 3, "positions" should read -- positioned --. Column 9, line 32, "for" should read -- fore --. Column 10, line 16, "of", first occurrence, should read -- on --.

Signed and sealed this 21st day of October 1969.

(SEAL)
Attest:

Edward M. Fletcher, Jr.                     WILLIAM E. SCHUYLER, JR.
Attesting Officer                               Commissioner of Patents